United States Patent
Heymer

(10) Patent No.: US 11,754,386 B2
(45) Date of Patent: Sep. 12, 2023

(54) METHOD AND SYSTEM FOR CAPTURING AND MEASURING THE POSITION OF A COMPONENT WITH RESPECT TO A REFERENCE POSITION AND THE TRANSLATION AND ROTATION OF A COMPONENT MOVING RELATIVE TO A REFERENCE SYSTEM

(71) Applicant: Ford Global Technologies, LLC, Dearborn, MI (US)

(72) Inventor: Arne Heymer, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 816 days.

(21) Appl. No.: 16/783,636

(22) Filed: Feb. 6, 2020

(65) Prior Publication Data
US 2020/0249009 A1 Aug. 6, 2020

(30) Foreign Application Priority Data
Feb. 6, 2019 (DE) .......................... 102019201526.3

(51) Int. Cl.
*G06K 9/00* (2022.01)
*G01B 11/00* (2006.01)
(Continued)

(52) U.S. Cl.
CPC .......... *G01B 11/002* (2013.01); *G02B 27/644* (2013.01); *G06T 3/0006* (2013.01);
(Continued)

(58) Field of Classification Search
None
See application file for complete search history.

(56) References Cited

U.S. PATENT DOCUMENTS

| 5,889,505 A * | 3/1999 | Toyama | G06T 7/246 345/157 |
| 8,073,201 B2 * | 12/2011 | Satoh | G06T 7/74 382/106 |

(Continued)

FOREIGN PATENT DOCUMENTS

EP 2952953 12/2015

OTHER PUBLICATIONS

Wu et al., Gaussian Particle Filter Based Pose and Motion Estimation, Journal of Zhejiang University—Science A, Oct. 2007, pp. 1604-1613, vol. 8 (10), Springer Nature Switzerland AG.

*Primary Examiner* — Avinash Yentrapati
(74) *Attorney, Agent, or Firm* — Burris Law, PLLC

(57) ABSTRACT

A method for capturing and measuring translation and/or rotation of a component moving relative to a reference system includes providing a marker on the component and providing a measurement system having a camera arranged in the reference system. The marker has at least three points which do not lie on a straight line on an upper side of the marker and the camera has an evaluation unit and memory that stores a geometry of the upper side including the at least three points. The camera is aligned with the at least three points and a first image of the marker located in a first portion is captured and stored and a second image of the marker in a second position that is different than the first position is stored. Also, translation and/or rotation of the component in three-dimensional space between the first position and the second position is calculated.

20 Claims, 7 Drawing Sheets

(51) Int. Cl.
*G06T 7/73* (2017.01)
*G06T 3/00* (2006.01)
*G02B 27/64* (2006.01)

(52) U.S. Cl.
CPC .................. *G06T 7/73* (2017.01); *G06T 7/74* (2017.01); *G06T 2207/30204* (2013.01); *G06T 2207/30252* (2013.01)

(56) References Cited

U.S. PATENT DOCUMENTS

| | | | |
|---|---|---|---|
| 2003/0063292 A1* | 4/2003 | Mostafavi | A61N 5/1049 356/614 |
| 2003/0210812 A1* | 11/2003 | Khamene | A61B 90/36 382/128 |
| 2004/0002642 A1* | 1/2004 | Dekel | G06T 7/74 600/407 |
| 2007/0081695 A1* | 4/2007 | Foxlin | G06T 7/73 382/103 |
| 2009/0022369 A1* | 1/2009 | Satoh | G01B 21/04 382/106 |
| 2009/0324009 A1* | 12/2009 | Schulz | G06T 7/73 382/103 |
| 2010/0282983 A1* | 11/2010 | Wright | A61N 5/1049 250/492.1 |
| 2016/0078627 A1* | 3/2016 | Daon | A61B 90/94 382/103 |
| 2016/0171702 A1* | 6/2016 | Wittmeier | G06T 7/246 382/103 |
| 2017/0079722 A1* | 3/2017 | O'Grady | A61G 13/04 |
| 2017/0143429 A1* | 5/2017 | Richmond | A61B 34/37 |
| 2017/0223279 A1* | 8/2017 | Mueller | G06T 7/70 |
| 2017/0348061 A1* | 12/2017 | Joshi | A61B 90/90 |
| 2018/0137646 A1* | 5/2018 | Kraszewski | G06T 7/73 |
| 2018/0325415 A1* | 11/2018 | Ehrl | G06T 7/246 |
| 2019/0154429 A1* | 5/2019 | Heymer | G01S 17/06 |
| 2019/0209080 A1* | 7/2019 | Gullotti | A61B 17/7035 |
| 2019/0290365 A1* | 9/2019 | Gao | A61B 90/39 |
| 2019/0291277 A1* | 9/2019 | Oleynik | B25J 9/1697 |
| 2020/0253640 A1* | 8/2020 | Mullaney | A61B 17/62 |
| 2022/0202548 A1* | 6/2022 | Rampulla | A61B 90/39 |

* cited by examiner

METHOD AND SYSTEM FOR CAPTURING AND MEASURING THE POSITION OF A COMPONENT WITH RESPECT TO A REFERENCE POSITION AND THE TRANSLATION AND ROTATION OF A COMPONENT MOVING RELATIVE TO A REFERENCE SYSTEM

CROSS-REFERENCE TO RELATED APPLICATIONS

This application claims priority to and the benefit of German Patent Application No. 102019201526.3 filed on Feb. 6, 2019. The disclosure of the above application is incorporated herein by reference.

FIELD

The present disclosure relates to measuring translation and rotation of a component moving relative to a reference system.

BACKGROUND

The statements in this section merely provide background information related to the present disclosure and may not constitute prior art.

A large number of practical applications require the complete description of the position and the motion of a component of a motor vehicle with respect to a reference system, specifically in all six degrees of freedom, that is to say the three degrees of freedom of translation and the three degrees of freedom of rotation of said component. Such examples of this include the movements of the engine and the transmission during a start-up operation, in particular during a restart after a switch-off operation, and during load changes, the movements of springs, elastic bearings and the like during travel, and the movements of body parts and thus the change in gap dimensions during travel, in particular during travel off-road.

According to the prior art, these movements are captured using various methods. These known methods have a number of disadvantages such as signals obtained from sensors must be integrated either once, in the case of speed measurements, or twice, in the case of acceleration measurements, to obtain the spatial position, drift and deviations, in particular scattering, of the signals provided by the sensors lead to inaccuracies in the result, which becomes noticeable in particular in the case of slow movements, and three-dimensional measurements in all six degrees of freedom are required.

For this purpose, a set of particular sensors that capture a spatial translation is used in the prior art. Said sensors can operate mechanically, optically, inductively or the like. Typically, one sensor per degree of freedom or per dimension is provided with one sensor required for each dimension that is to be captured at a site of the component, that is to say three sensors for the three-dimensional spatial translation and six sensors for capturing movements in all six degrees of freedom.

As such, a relatively complicated measurement arrangement is required, as is access to the component from at least three sides of the component.

In a known measurement method, markers attached to the component are used. They are captured using two charge-coupled device (CCD) cameras located in the reference position. Using triangulation, the position is calculated, e.g., by using known methods and systems such as GOM PONTOS, Metris K-System, among others, and which may be registered trademarks. These methods require a particular illumination. Space for the positioning of the two cameras at an adapted, sometimes significant distance from one another is required. The methods are expensive.

U.S. Pat. No. 8,073,201 B2 discloses a method and an apparatus for capturing and measuring the position and orientation of an object and in particular of an image of an object captured using a camera. A multiplicity of different markers Q1 to Qn are provided on the object. The coordinates of this mark on the object are captured and the position and orientation of the individual visible markers are ascertained by way of an algorithm. If the markers are distributed over a sufficiently large area, it is possible to capture six parameters of the position and orientation as unknowns. If the distribution area of the markers becomes smaller, the number of the degrees of freedom that can be captured is lower.

US 2003/0063292 A1 discloses a method for tracking the location and angular position of an object in three-dimensional space using a single camera. The object is preferably a surgical instrument. At least three markers are provided on the object. The positions thereof are optically tracked, and the location in space of the object is ascertained therefrom.

In the above-mentioned US publications, the position of the markers on the object is not prescribed but arbitrary. The markers are arranged on the object as is made possible by the object.

EP 2 952 953 A1 discloses a method for aligning a camera system with a target object, and a corresponding camera system.

SUMMARY

This section provides a general summary of the disclosure and is not a comprehensive disclosure of its full scope or all of its features.

The present disclosure provides a capturing apparatus for six degrees of freedom using only one marker on the component. The capturing apparatuses operates in a way such that a simple test setup with only one camera in a position in the reference system suffices, wherein the component needs to be captured from only one direction.

In one form of the present disclosure, a method for capturing and measuring the translation and the rotation of a component moving relative to a reference system, in particular of a component of a motor vehicle, in three-dimensional space and at six degrees of freedom includes providing a marker on the component, wherein the marker has a rigid carrier and can be attached to the component, and at least three points which are located on an upper side of the marker and not located on a straight line. The method also includes providing a measurement system having a camera arranged in the reference system and with respect to the translation and rotation of the moving component to be captured. An evaluation unit is included and connected to the camera, and the geometry of the upper side and the at least three points can be stored by or in the evaluation unit. The camera is aligned with the at least three points. In at least one variation the camera is aligned with a centerpoint of the at least three points, for example the camera can be aligned with a centerpoint of a circle that extends through the three points. The method includes capturing a first image of the marker and of the component located in a first position and determining the location of the at least three points in the first image such that x- and y-coordinates of the at least three points and the alignment thereof in the image plane of the first image are determined. The method also includes capturing a second image of the marker and of the component which are located in a second position which differs from the first position, and determining the location of the at least three points in the second image such that x- and y-coordinates of the three points and the alignment thereof in the image plane of the second image are determined. In some variations of the present disclosure, the method further includes calculating the translation and rotation of the component in three-dimensional space between the first and the second position of the component, for example, using the x- and y-coordinates determined in the first image and the second image.

In some variations, a first position of the marker in three-dimensional space is calculated and gives a reference position. Also, another reference position at a different time is possible. A second position of the marker in three-dimensional space with respect to translation and rotation relative to the reference position can be calculated and the x- and y-coordinates and the alignment of the at least three points in the two images can be compared.

The at least three points are particular symbols or areas that are clearly differentiated from the background of the upper side. If the contrast between black and white is denoted as one, and the contrast between white and white is denoted as zero, and furthermore the transition from contrast zero to contrast one is linear, the contrast between the points and the background should be as close to one as is possible, in particular be greater than 0.3, preferably greater than 0.5, and ideally be greater than 0.7. The contrast between a white (black) area and an area that is 50% white and 50% black is 0.5. The transition between the points and any additionally provided mark, on the one hand, and the background on the other is as sharp as possible, without any soft transitions. That is, the transition should correspond to the mathematical step function. In some variations the background is black and the points or the additional mark are white, or vice versa. In other variations a colored representation of the background and/or the points is possible.

In another form of the present disclosure, a system for capturing and measuring the translation and rotation of a component moving relative to a reference system, for example for capturing and measuring the translation and rotation of a component of a motor vehicle in three-dimensional space and at six degrees of freedom, includes a marker having a rigid carrier, attachment of the marker to to the component, and an upper side on which at least three points, which are not located on a straight line, are arranged on a background. A measurement system having a camera and an evaluation unit is included. The evaluation unit can be connected to the camera and is arranged in the reference system. The evaluation unit can include a computer in which a program for image capturing and evaluation runs, and a memory, in which the geometry of the upper side and thus in particular of the three points is stored.

It should be understood that the system according to the present disclosure has the advantage that it uses only one camera, which is directed at a particular, two-dimensional marker. Also, in some variations only one marker on the component is needed.

In some variations the camera is connected to the reference system. The reference system is, as is generally known, a reference system with respect to which most if not all measurements are performed. The marker is connected to the moving component and moves together therewith. The movement preferably takes place within the measurement region that is permitted by the camera, or the measurement region is correspondingly predefined for the camera.

It should be understood that the method and system according to the teachings of the present disclosure does not need a multiplicity of markers. Only one marker is desired, and this marker has a particular geometry that is known to the capturing system. Also, the marker is not captured as a point but as a two-dimensional entity on which the at least three points are defined, which for their part can be understood to be submarkers. It is possible in this way to capture the position of the marker itself, without having to use further markers. The object or component to which the marker according to the present disclosure is attached can be irrelevant. That is, the marker merely needs to be fixedly connected to the component, because the position of the former (i.e., the marker) represents the position of the component. Since the position of the marker according to the present disclosure on the component is known, it is also simpler than it is in the prior art to ascertain the location of the component itself in space, because the component is fixedly connected to the single marker. In contrast to the prior art, it is not even needed for the marker according to the present disclosure to be connected to a component, because the position thereof within the six degrees of freedom is ascertained without taking into account the component. In some variations of the present disclosure, during measurement, the position of the at least three points of the marker relative to the component is not changed. In other words, the connection of the marker to the component is sufficiently fixed, and the location of the marker relative to the component does not change during the measurement. In addition, it is desired for the marker not be set in vibratory motion on account of the movement of the component. This can be inhibited by a corresponding design of a carrier, for example a layer structure. If possible, the carrier should not be prone to forced and natural oscillations, but rather these should be damped. It is advantageous to connect the carrier to the component over as large an area as possible. Furthermore, the geometric location and alignment of the at least three points relative to one another should or must not be changed by the attachment to the component. For example, the marker should or must not be bent on account of being attached. The marker can have a rigid carrier on which the at least three points are provided, and the rigid carrier can be attached to the component via a suitable attachment technique or method. This provides that no deformation of the at least three points relative to one another occurs during the attachment and during the measurement.

It should be understood that the method and corresponding system according to the present disclosure have the advantage over laser-based profilometers that even relatively major deflections can be captured both for translation and for rotation by way of the capturing and measurement operations, and the measurement region, also referred to as the measurement field, is delimited only by the discernibility of the marker (measurement field, resolution of the camera) and sufficient reflection of the marker, generally plus/minus 45° for the rotation about the x-axis and the y-axis and plus/minus 180° for the rotation about the z-axis, when based on a right-hand, orthogonal coordinate system having the three axes x, y and z. For many applications, the camera-based system according to the present disclosure is significantly less expensive (i.e., cost less) than the solutions of the prior art. It can be realized by way of a conventional CCD camera and conventional technology for image recognition, with the image recognition being adapted to and adjusted for the relevant features of the particular marker.

The particular marker, also referred to as target, is designed and configured such that the respective position and alignment and thus the spatial change of the marker can be brought about by way of analyzing only one image of the single camera. At least three particular elements on the marker in defined positions known to the system can be specified and desired to obtain a full description of and for fully capturing all six degrees of freedom from the respective imaged representation of the marker. Also, it is desirable that the system exactly knows the marker, that is to say that the concrete geometric design of the marker is stored in the system and is compared to the subsequent or current captured images of the marker.

If the points on the marker exhibit rotational symmetry, which is the case for example if they are located on the corners of an equilateral triangle and additionally all three points are congruent, it is not desired, although possible, to provide an additional mark on the marker that specifies the alignment. If a mark is provided on the marker, it too is stored in the measurement system. If the points on the marker exhibit rotational symmetry, it is advantageous to store said rotational symmetry in the measurement system.

In order to facilitate the detection of three points A, B and C by the measurement system, in particular by the camera thereof, the contrast between the three points and any additionally provided mark for capturing the alignment and the environment thereof, that is to say the background, is as great as possible. For this reason, in some variations of the present disclosure only the colors black and white are used for the marker. However, this does not rule out a different color scheme. Furthermore, the transition from one point to a background on the upper side of the marker is as abrupt or discontinuous as possible, e.g., representative of a mathemartical step function.

In some variations of the present disclosure the marker is permanently connected to the component. In such variations, an attachment technique or method is not needed to attached the marker to the component. Also, it is desirable that when an attachment technique or method is used to attach the marker to the component, detachment of the marker after completion of the measurement should leave as little residue as possible (e.g., when using an adhesive to attach the marker to the component). During the measurement, the marker should move like, and together with, the component.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
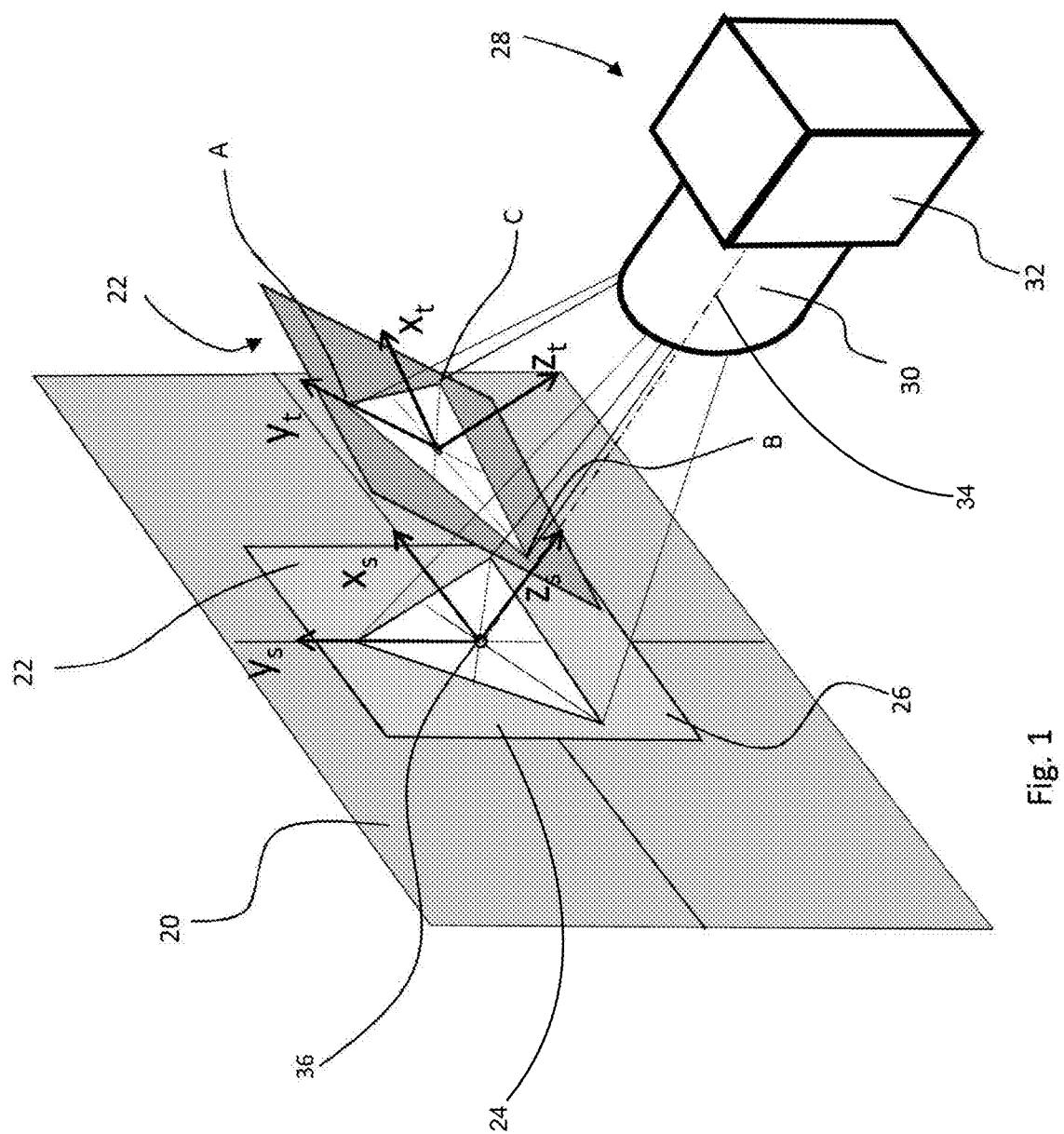
FIG. 1 shows a perspective illustration of a measurement system and a component in a first position, to which a marker is attached, and a second position of the marker without the component, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows a component 20, illustrated here only schematically, in a first position, to which a marker 22 is removably attached over as large an area as possible using, for example, hot-melt adhesive bonding. The marker 22 has a square carrier 24 having an upper side 26. The carrier 24 is produced to be rigid but also resistant to vibrations, preferably made from a layered material, such as aluminum-foam-aluminum. In some variations of the present disclosure, the carrier 24 does not become deformed by the connection to the component 20. That is, during the movements of the component 20, the carrier 24 moves rigidly with the component 20 and does not exhibit natural oscillations.

The same marker 22 is illustrated in a second position in FIG. 1, in which it is in front of the first position (i.e., closer to a camera 30). The component 20 is not illustrated in the second position.

A measurement system 28, which in the present case is arranged in a spatially fixed reference system, has a camera 30 and an evaluation unit 32. The camera 30 has a sensor and an optical axis 34 and is directed at a centerpoint 36, also referred to as evaluation point, of the marker 22. The evaluation unit 32 has image recognition and stores the geometric data of the marker 22 that is being used. The geometric data include the three corner points of a triangle situated on the marker 22, with the corner points being the points A, B and C shown in FIG. 1, which are to be captured.

Referring to FIGS. 2 to 5, possible variations of a "type A" marker 22 according to the teachings of the present disclosure are shown. The hatching signifies a completely black color, while everything that has not been hatched is white, with the exception of the thick black lines in FIGS. 3 to 5. The transition between black and white in each case is desirably abrupt. FIGS. 2 to 5 also show a mark 38 for the purposes of alignment, which can be desirable. The position of the mark 38 on the marker 22 is likewise stored in the evaluation unit 32.

Figure 2:
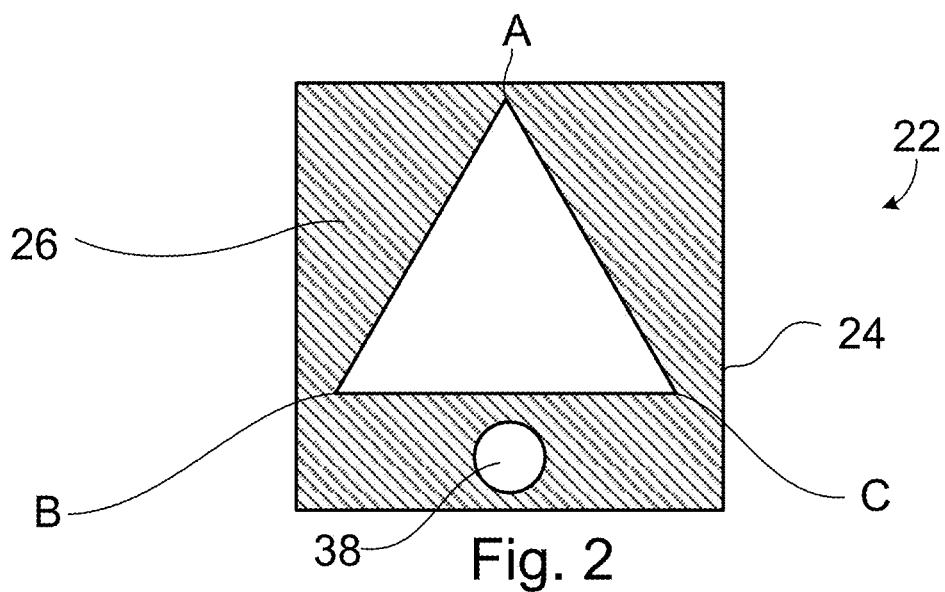
FIG. 2 shows a plan view of a first configuration of a marker of type A according to the teachings of the present disclosure.
Figures 3, 4, 5:
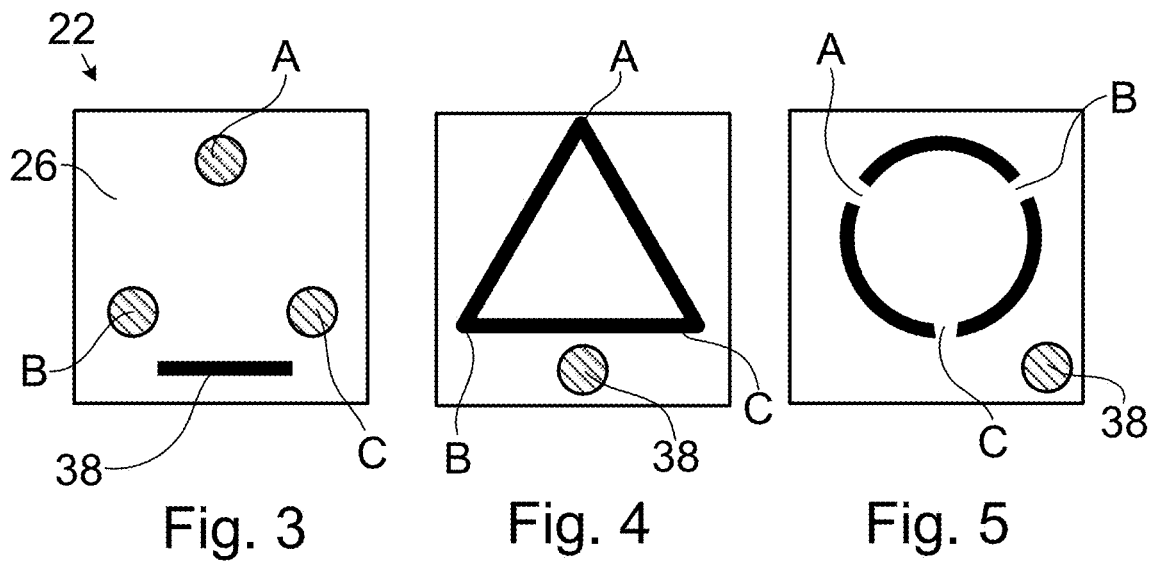
FIG. 3 shows a plan view of a second configuration of the marker of type A according to the teachings of the present disclosure.
FIG. 4 shows a plan view of a third configuration of the marker of type A according to the teachings of the present disclosure.
FIG. 5 shows a plan view of a fourth configuration of the marker of type A according to the teachings of the present disclosure.

Regarding the type A marker 22, the three points A, B and C are defined as corner points of an equilateral triangle having the side length "l." The corner points are identical, that is to say a 120° rotation about the centerpoint P (FIG. 6) of the circumcircle of the triangle produces the same triangle, that is to say a rotational symmetry of 120°. For the purposes of alignment, in some variations of the present disclosure an additional mark 38 is provided. In FIGS. 2, 4 and 5, the mark 38 is a small circular area, and in FIG. 3 the mark 38 is a small bar. FIGS. 2 to 5 also show alternatives of a different design of the points A, B and C. In FIG. 2, the points A, B and C are represented by the corner points of the triangle having the white area, in FIG. 3 the points A, B and C are represented by congruent black circular areas on the corner points of the triangle, in FIG. 4 the points A, B and C are represented by the corner points of a triangle having a black boundary line, and in FIG. 5 the points A, B and C are represented by white gaps in a black circular ring. In FIG. 2, the background is black, and in FIGS. 3 to 5 the background is white in each case. The mark 38 for FIG. 2 is white, otherwise the mark 38 is black. The mark 38 also exhibits a contrast and an abrupt transition with respect to the background on the upper side 26. As used herein, the phrase "abrupt transition" refers to a change from one color to another color, e.g., black to white or white to black, that can be represented by a mathematical step function. In some variations of the present disclosure, the mark 38 also exhibits as great or high as possible color contrast and an abrupt transition with respect to the background on the upper side 26. The dimensions illustrated in FIG. 6 are used for a calculation and it is possible to choose different dimensions, although different dimensions typically require different algorithms.

Figure 6:
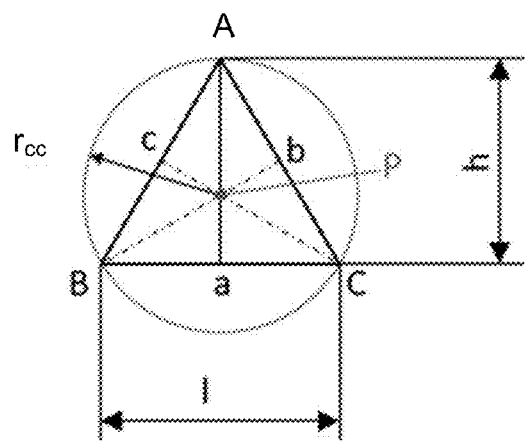
FIG. 6 shows a geometric illustration of relevant dimensions according to the teachings of the present disclosure.
Figure 7:
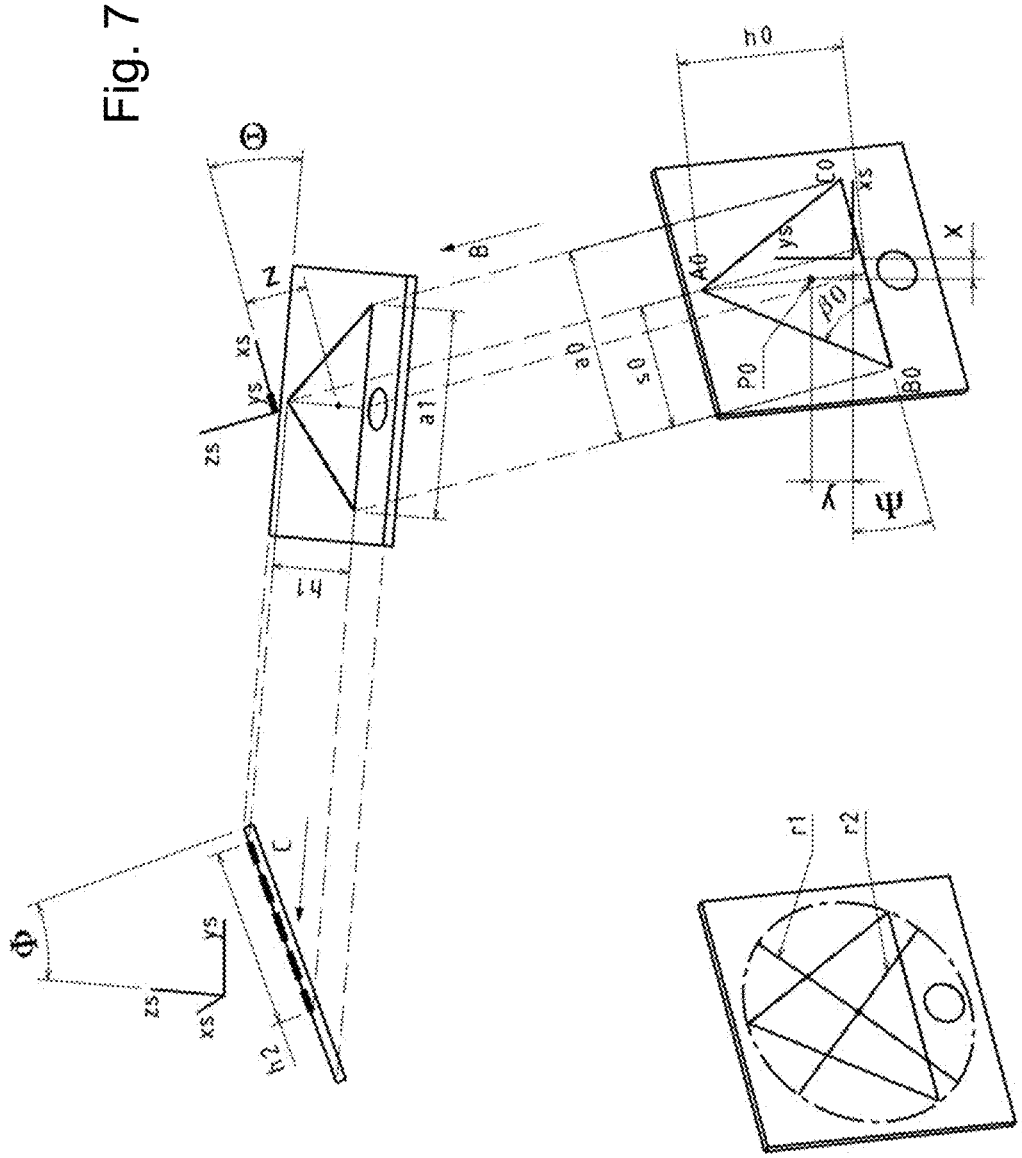
FIG. 7 shows a geometric illustration of different views in parallel projection of the marker of type An according to the teachings of the present disclosure.
Figure 8:
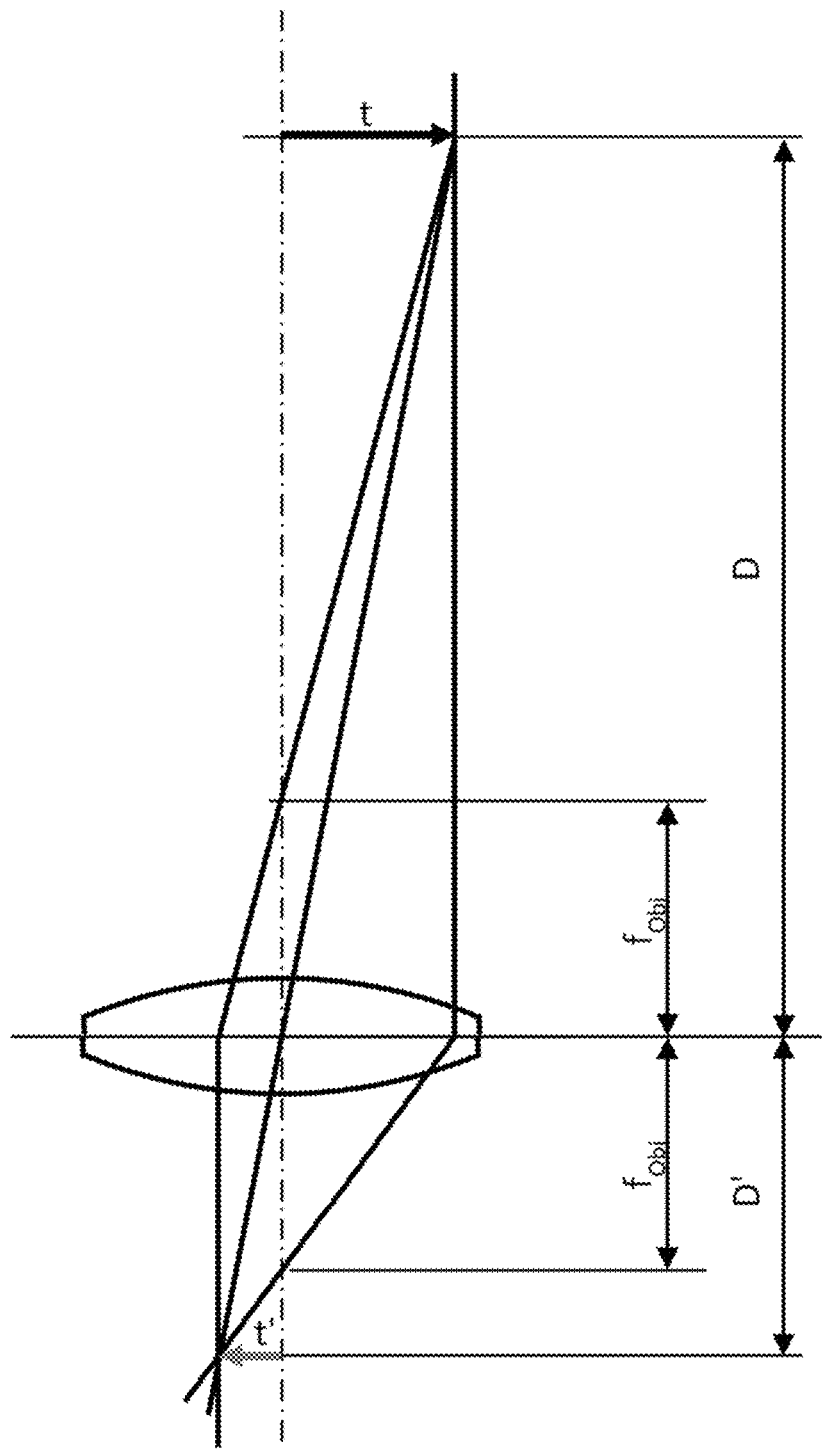
FIG. 8 shows a simplified geometric illustration of a beam path according to the teachings of the present disclosure.

FIGS. 6, 7 and 8 serve for explaining the following description for transformations used with the following dimensions defined as:

Side length of the equilateral triangle: l=a=b=c
Focal length of the objective lens of the camera 30: $f_{Obj}$
Distance of the camera 30 from the marker 22: D'
Active sensor width (CCD chip of the camera): $w_s$
Active sensor height (CCD chip of the camera): $h_s$
And dimensions of the marker 22 being:
h=height of the triangle:

$$h = \sqrt{\frac{3}{4}} l$$

$r_{cc}$=radius of the circumcircle of the triangle:

$$r_{cc} = \sqrt{\frac{3}{9}} l$$

Measured coordinates are: $A_0$ ($A_{0x}$|$A_{0y}$), $B_0$ ($B_{0x}$|$B_{0y}$), $C_0$ ($C_{0x}$|$C_{0y}$), where $A_0$ is the coordinate opposite the base of the triangle, defined by the additional mark 38. That is, the additional mark 38 is positioned proximate the base of the triangle in FIGS. 3-5 and $A_0$ is the coordinate opposite the base of the triangle.

For the nomenclature used, the following example is given: "$A_{0y}$"=$y_s$-coordinate of $A_0$ and "$A_{0x}$"=$x_s$-coordinate of $A_0$ in the plane of the image sensor (sensor coordinate system).

These values (i.e., $A_0$, $B_0$, $C_0$) represent the positions of the three points captured in the plane of the sensor. If the measured coordinates were initially captured in image points ("pixels") of the sensor image, their actual positions that they occupy in the plane of the sensor of the camera 30 can be obtained by setting the height of the image produced and its width to the active sensor height and sensor width $h_s$ and $w_s$, respectively. It is possible to use correction factors to correct the image curvature and other lens aberrations of the objective lens of the camera 30.

The side lengths of the triangle in the plane of the sensor are:

$$a_0 = \overline{B_0 C_0} = \sqrt{(C_{0x} - B_{0x})^2 + (C_{0y} - B_{0y})^2}$$

$$b_0 = \overline{A_0 C_0} = \sqrt{(C_{0x} - A_{0x})^2 + (C_{0y} - A_{0y})^2}$$

$$c_0 = \overline{A_0 B_0} = \sqrt{(B_{0x} - A_{0x})^2 + (B_{0y} - A_{0y})^2}$$

And the midpoints of the triangle sides are then ascertained by:

$$M_{a0x} = \frac{(C_{0x} + B_{0x})}{2}; M_{a0y} = \frac{(C_{0y} + B_{0y})}{2}$$

$$M_{b0x} = \frac{(C_{0x} + A_{0x})}{2}; M_{b0y} = \frac{(C_{0y} + A_{0y})}{2}$$

$$M_{c0x} = \frac{(A_{0x} + B_{0x})}{2}; M_{c0y} = \frac{(A_{0y} + B_{0y})}{2}$$

Also, the centerpoint P of the circumcircle of the triangle is calculated by the following procedure.

In the undeformed triangle, that is to say when the optical axis 34 of the camera 30 extends at a right angle to the surface of the marker 22, P is the centerpoint of a circumcircle of the triangle, defined by the point of intersection between two perpendicular bisectors, which are at the same time lines bisecting an angle. The two perpendicular bisectors can also be described as straight lines that each connect a corner point to the midpoint on the opposite side where:

$P_0$=point of intersection of the straight lines through $\overline{B_0 M_{b0}}$ and $\overline{C_0 M_{c0}}$ and:

$$P_{0x} = \frac{(M_{c0x} - C_{0x}) \cdot (M_{b0x} \cdot B_{0y} - B_{0x} \cdot M_{b0y}) - (M_{b0x} - B_{0x}) \cdot (M_{c0x} \cdot C_{0y} - C_{0x} \cdot M_{c0y})}{(M_{c0y} - C_{0y}) \cdot (M_{b0x} - B_{0x}) - (M_{b0y} - B_{0y}) \cdot (M_{c0x} - C_{0x})}$$

-continued $$P_{0y} = \frac{(B_{0y} - M_{b0y}) \cdot (M_{b0x} \cdot C_{0y} - C_{0x} \cdot M_{c0y}) - (C_{0y} - M_{c0y}) \cdot (M_{b0x} \cdot B_{0y} - B_{0x} \cdot M_{b0y})}{(M_{c0y} - C_{0y}) \cdot (M_{b0x} - B_{0x}) - (M_{b0y} - B_{0y}) \cdot (M_{c0x} - C_{0x})}$$

Point $P_0$ is the centerpoint 36 of an ellipse that is the projection of the circumcircle of the triangle. On account of the rotational symmetry of the ellipse, further points of the ellipse can be found as follows:

$$D_{0x} = P_{0x} - (A_{0x} - P_{0x}); D_{0y} = P_{0y} - (A_{0y} - P_{0y})$$

$$E_{0x} = P_{0x} - (B_{0x} - P_{0x}); E_{0y} = P_{0y} - (B_{0y} - P_{0y})$$

$$F_{0x} = P_{0x} - (C_{0x} - P_{0x}); F_{0y} = P_{0y} - (C_{0y} - P_{0y})$$

It should be understood that these parameters of the ellipse are desired to ascertain the distance of the marker 22 from the sensor and are calculated as follows.

Algorithm for Ascertaining the Translational Movement and the Rotation of the Marker 22:

Calculation of the ellipse, projected image of the circumcircle as shown in FIG. 7 is generally described by the following formula:

$$c_a x^2 + c_b xy + c_c y^2 + c_d x + c_e y + c_f = 0$$

It is possible here to freely select one of the coefficients c, for example $c_a = 1$, leaving 5 unknowns (e.g. $c_b \ldots c_f$) which can be ascertained by way of five linear equations, with each of said linear equations using the x- and y-coordinates of one of the 5 points on the circumcircle of the ellipse. This system of linear equations can be solved using conventional methods, provided the three corner points of the triangle are detected and do not lie on a straight line.

Using the ascertained coefficients $c_a \ldots c_f$, an axis transformation can be used to determine the semi-major axis of the ellipse. To this end, the following formula can be used:

$$(x \quad y) \begin{pmatrix} c_a & c_{b/2} \\ c_{b/2} & c_c \end{pmatrix} \begin{pmatrix} x \\ y \end{pmatrix} + (c_d \quad c_e) \begin{pmatrix} x \\ y \end{pmatrix} + c_f = 0$$

or in simplified form:

$$v^T A v + u^T v + c_f = 0$$

This can be converted into the following form:

$$v'^T D v' + u^T T v' + c_f = 0$$

where:
D=matrix A that has been brought into the diagonal form:

$$\det A_\lambda = \begin{vmatrix} (c_a - \lambda) & c_{b/2} \\ c_{b/2} & (c_c - \lambda) \end{vmatrix} \overset{!}{=} 0 \Rightarrow D = \begin{pmatrix} \lambda_1 & 0 \\ 0 & \lambda_2 \end{pmatrix};$$

$\lambda_{1,2}$: eigen values of A

T=transformation matrix (rotation of the ellipse):

$$T = \begin{pmatrix} t_{11} & t_{12} \\ t_{21} & t_{22} \end{pmatrix}$$

where $t_1 = \begin{pmatrix} t_{11} \\ t_{21} \end{pmatrix}$ and $t_2 = \begin{pmatrix} t_{12} \\ t_{22} \end{pmatrix}$:

And normalized *eigenvectos* with respect to the *eigen* values $\lambda_{1,2}$ such that $\det T = 1$ (rotation matrix)

The calculation of the stated terms results in the description of an ellipse of the same size, but rotated into a position with the semi-major axis parallel to the coordinate system:

$$\lambda_1 x^2 + \lambda_2 y^2 + (c_d t_{11} + c_e t_{21}) x + (c_d t_{12} + c_e t_{22}) y + c_f = 0$$

which can be converted into:

$$\lambda_1 \left(x + \frac{p_x}{2}\right)^2 + \lambda_2 \left(y + \frac{p_y}{2}\right)^2 + q = 0 \quad (*)$$

where:

$$p_x = \frac{(c_d t_{11} + c_e t_{21})}{\lambda_1}; \quad p_y = \frac{(c_d t_{12} + c_e t_{22})}{\lambda_2};$$

$$q = -\lambda_1 \left(\frac{p_x}{2}\right)^2 - \lambda_2 \left(\frac{p_y}{2}\right)^2 + c_f$$

The coordinates of the centerpoint 36 of the rotated ellipse are:

$$x_C = -\frac{p_x}{2} \text{ and } y_C = -\frac{p_y}{2}$$

Setting $y = y_C$ and $x = x_C$ in gives the points of intersection of the straight lines, determined by the major and the minor axis, with the ellipse:

$$x_{1,2} = -\frac{p_x}{2} \pm \sqrt{-\frac{q}{\lambda_1}}; \quad y_{1,2} = -\frac{p_y}{2} \pm \sqrt{-\frac{q}{\lambda_2}}$$

Consequently, the lengths of the semi-axes are:

$$r_1 = \sqrt{-\frac{q}{\lambda_1}}; \quad r_2 = \sqrt{-\frac{q}{\lambda_2}}$$

Here, the larger value for the semi-major axis $r_a$ applies:

$$r_a = \max(r_1, r_2)$$

The value thus calculated is effected specifically for the marker of type A and will be used later to determine the translation.

Figure 9:
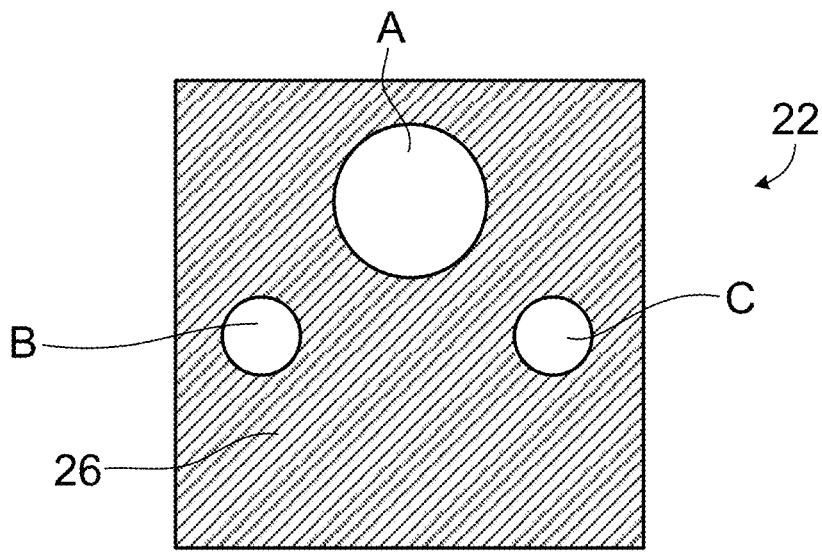
FIG. 9 shows a plan view of a first configuration of a marker of type B according to the teachings of the present disclosure.
Figures 10, 11, 12:
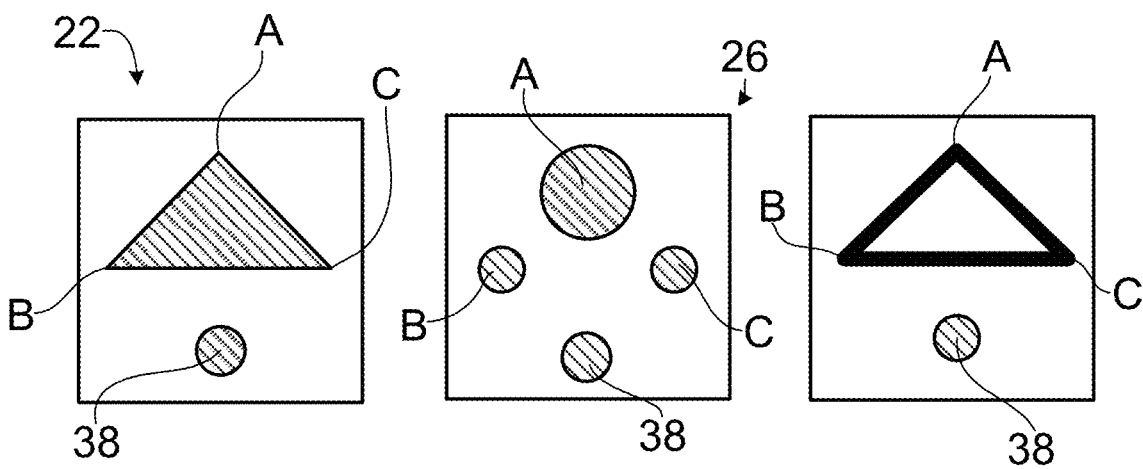
FIG. 10 shows a plan view of a second configuration of the marker of type B according to the teachings of the present disclosure.
FIG. 11 shows a plan view of a third configuration of the marker of type B according to the teachings of the present disclosure.
FIG. 12 shows a plan view of a fourth configuration of the marker of type B according to the teachings of the present disclosure.

Marker 22 of Type B:

Regarding the type B marker 22, FIGS. 9 to 12 show markers 22, which are configured similarly to the markers 22 of FIGS. 2 to 5, which have already been described, but in this case they have a different geometry of the points and possibly of the mark. Reference is made to that description, and therefore only the differences will be explained. One difference lies in the fact that the points A, B, C no longer rely on the corner points of an equilateral triangle, but of an isosceles right triangle. Furthermore, the points are now no longer congruent. Rather, the point A in FIG. 9 is illustrated by way of a considerably larger circular area than the two other points B and C, and a mark is therefore not desired, but it may be advantageous, as shown in FIG. 11.

The calculation for the sensor of type B will now be explained.

Figure 13:
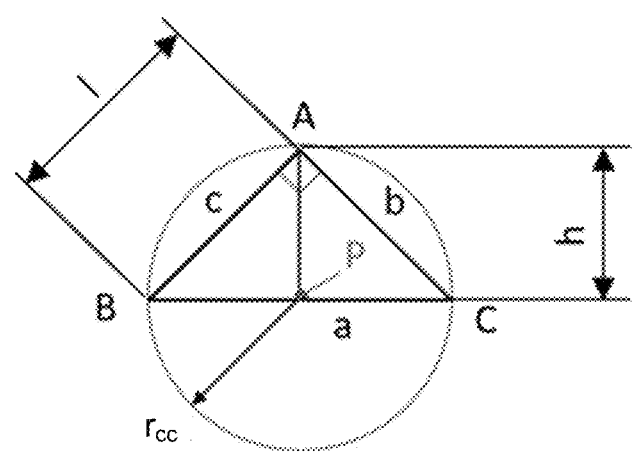
FIG. 13 shows a geometric illustration of relevant dimensions similar to FIG. 6 according to the teachings of the present disclosure.

Sensors of type B permit a considerably simpler algorithm for the calculation of the ellipse of the circumcircle because the points A, B, C define particular points on the ellipse (conjugated diameters):

For this form of the present disclosure, the points "A", "B" and "C" are the corner points of an isosceles right triangle. Consequently, they lie on three corner points of a square. The point "A" is the vertex of the right angle. "A" can for example be specified by a particular geometry of said point, a different size, a different form, a different color or by an additional mark and can thus be recognized in the evaluation unit 32. The dimensions stated in FIG. 13 are used for the calculation. Other geometries are possible, however they may need different algorithms than described below.

Figure 14:
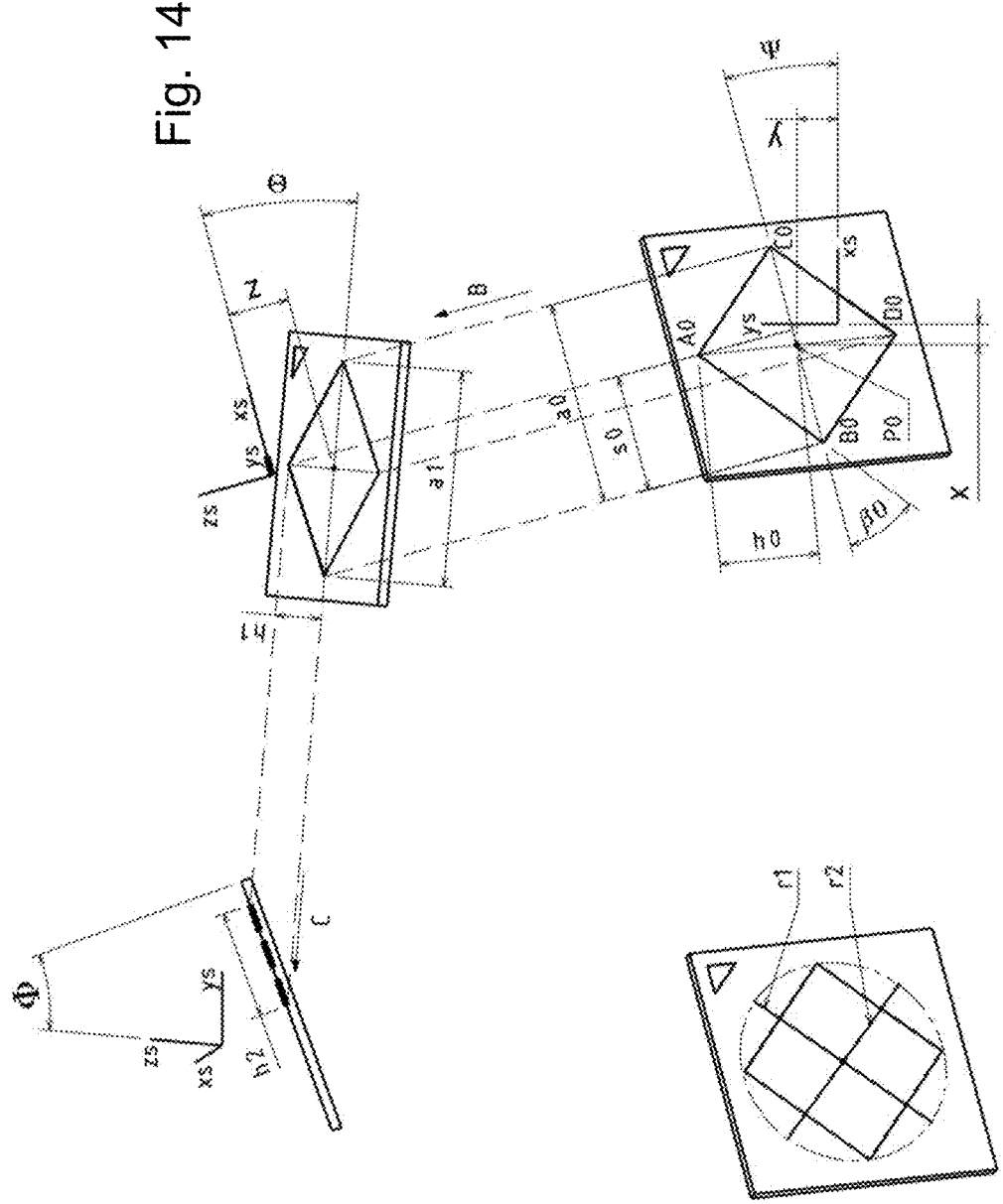
FIG. 14 shows a geometric illustration of different views in parallel projection of the marker of type B similar to FIG. 7 according to the teachings of the present disclosure.
Figure 15B:
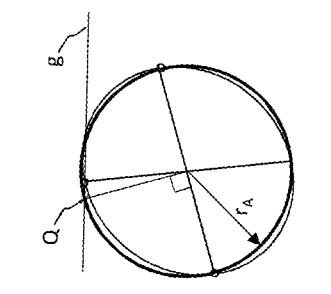
FIGS. 15a-15d show geometric illustrations for explaining a calculation according to the teachings of the present disclosure.
Figure 15D:
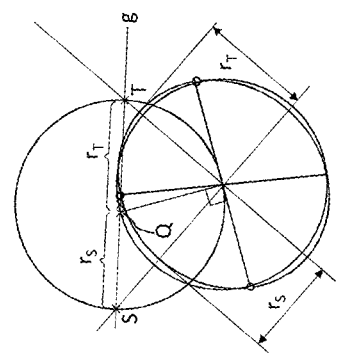
Figure 15A:
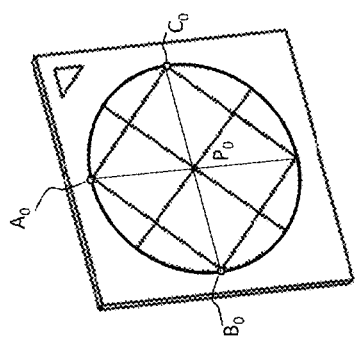
Figure 15C:
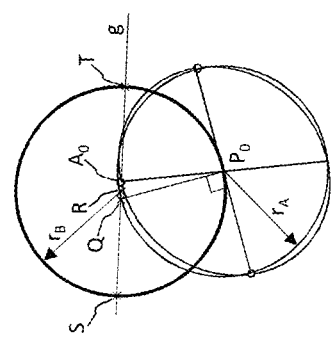

Algorithm for Calculating the Translational Movement and the Rotation in Space of the Marker 22 of Type B:

FIGS. 8 and 14 show the variables used in the algorithm for the calculation with the following dimensions defined as:
  Side length of the isosceles triangle: I=b=c;
  Focal length of the objective lens of the camera 30: $f_{Obj}$;
  Distance of the camera 30 from the marker 22: D';
  Active sensor width (CCD chip): $w_s$; and
  Active sensor height (CCD chip): $h_s$;
  Dimensions of the marker 22 are defined as:
  h=height of the triangle;
  And the parameters of the marker 22 are defined as:
  a=length of the base of the triangle:
  a=l√2; and
  h=height of the isosceles triangle of the marker 22 and $r_{cc}$=radius of the circumcircle of the triangle:

$$h = r_{cc} = \tfrac{1}{2} l \sqrt{2};$$

Measured coordinates (in the plane of the sensor) are: $A_0$ ($A_{0x}$|$A_{0y}$), $B_0$ ($B_{0x}$|$B_{0y}$), $C_0$ ($C_{0x}$|$C_{0y}$), where $A_0$ is the vertex of the right angle.

For the nomenclature used, the following example is given: "$A_{0y}$"=$y_s$-coordinate and "$A_{0x}$"=$x_s$-coordinate of $A_0$ in the camera image (sensor plane of the camera 30).

These values (i.e., measured coordinates) represent the positions of the three points captured in the plane of the sensor. If the measured coordinates were initially captured in image points ("pixels") of the sensor image, their actual positions that they occupy in the plane of the sensor of the camera 30 can be obtained by setting the height of the image produced and its width to the active sensor height and sensor width $h_s$ and $w_s$, respectively. It is possible to use correction factors to correct the image curvature and other lens aberrations of the objective lens of the camera 30.

Capturing of Point P, the Centerpoint:
  $P_0$ is the midpoint between $B_0$ and $C_0$:

$$P_{0x} = \frac{(C_{0x} + B_{0x})}{2}; \quad P_{0y} = \frac{(C_{0y} + B_{0y})}{2}$$

and the side lengths of the triangle in the image of the camera 30 (plane of the sensor) are:

$$a_0 = \overline{B_0 C_0} = \sqrt{(C_{0x} - B_{0x})^2 + (C_{0y} - B_{0y})^2}$$

$$b = \overline{A_0 C_0} = \sqrt{(C_{0x} - A_{0x})^2 + (C_{0y} - A_{0y})^2}$$

$$c_0 = \overline{A_0 B_0} = \sqrt{(B_{0x} - A_{0x})^2 + (B_{0y} - A_{0y})^2}$$

The circumcircle of the triangle, which is identical to the circumcircle of the rectangle formed by the addition of a congruent triangle, appears as an ellipse having the centerpoint $P_0$ in the sensor plane of the camera 30, wherein a parallel projection is assumed. The point A is the end point of the radius "h" of said circumcircle, the point D is the exact opposite point on the circumcircle, and the points B and C are end points of a diameter at a right angle to h. Consequently, the projected points $A_0$, $B_0$, $C_0$, $D_0$ (FIG. 14) form two conjugated diameters of the ellipse. It should be understood that the parameters of this ellipse are desired to determine the distance of the marker 22 from the sensor and are ascertained, based on a Rytz's construction, as shown in FIG. 15, as follows:
  Circle around $P_0$ having the radius $r_A$(=½$B_0 C_0$);
  Perpendicular to $B_0 C_0$, intersection with the circle=>Q;
  Line through Q and $A_0$=>g;
  Midpoint between Q and $A_0$=>R;
  Circle around the center R having the radius $r_B$(=R$P_0$);
  Intersection of this circle and g=>S and T;
  The distances QS and QT represent the lengths of the semi-axes of the ellipse; and
  The longer one (here: QT) represents the semi-major axis $r_a$, and the shorter one represents the semi-minor axis.

Accordingly, lines through $P_0$ S and $P_0$T represent the directions of the semi-axes of the ellipse with the straight line through $P_0$ and the point S or T having the greater distance from Q (here: T) representing the direction of the semi-major axis and the straight line through $P_0$ and the point S or T having the shorter distance from Q (here: S) representing the direction of the semi-minor axis (at a right angle with respect to the semi-major axis, proof by what is referred to as Thales's circle).

These calculations are significantly simpler than calculations for the marker 22 of type A (equilateral triangle) because no axis transformation is desired or needed to determine the semi-axes and thus the increased time spent for solving a set of linear equations is dispensed with.

Using the coordinates in the sensor plane (origin in the upper left corner, +x to the right, +y down), the following is calculated:

$$P_{0x} = \frac{B_{0x} + C_{0x}}{2}; \quad P_{0y} = \frac{B_{0y} + C_{0y}}{2}$$

$$Q_x = P_{0x} - (B_{0y} - P_{0y}); \quad Q_y = P_{0y} + (B_{0x} - P_{0x})$$

It should be understood that this calculation is a rotation about 90° in the mathematically positive sense in the given coordinate system, in the image consequently in the direction of clockwise rotation. Also:

$$R_x = \frac{A_{0x} + Q_x}{2}; \quad R_y = \frac{A_{0y} + Q_y}{2};$$

$$r_B = \sqrt{(R_x - P_{0x})^2 + (R_y - P_{0y})^2};$$

$$S_x = R_x - r_B * \frac{Q_x - A_x}{\sqrt{(Q_x - A_x)^2 + (Q_y - A_y)^2}};$$

-continued $$S_y = R_y - r_B * \frac{Q_y - A_y}{\sqrt{(Q_x - A_x)^2 + (Q_y - A_y)^2}}; \text{ and}$$

$$T_x = R_x + r_B * \frac{Q_x - A_x}{\sqrt{(Q_x - A_x)^2 + (Q_y - A_y)^2}};$$

$$T_y = R_y + r_B * \frac{Q_y - A_y}{\sqrt{(Q_x - A_x)^2 + (Q_y - A_y)^2}}$$

The semi-axes are:

$$r_S = \overline{QS} = \sqrt{(Q_x - S_x)^2 + (Q_y - S_y)^2}; r_T = \overline{QT} = \sqrt{(Q_x - T_x)^2 + (Q_y - T_y)^2}$$

where, the semi-major axis $r_a$ is:

$$r_a = \max(r_S; r_T)$$

Calculation of the Distance of the Marker 22 (Type A and B) from the Sensor:

If a circle is projected onto a plane to form an ellipse, the semi-major axis keeps the length of the radius of the circle (for parallel projection). Since the ellipse was formed by rotating the circumcircle of the triangle of the marker 22, the semi-major axis of the ellipse represents the radius of the circumcircle. Therefore, the comparison of the real size of the circle to the length of the semi-axis can be used to determine the distance of the marker 22 from the sensor (in the direction of the z-coordinate) or the main plane of the objective lens, because a ratio ≠1 is caused by the (non-parallel) projection, specifically by an entocentric lens of the sensor.

The aspect ratio when using a thin lens (see FIG. 8) is defined as:

$$\frac{r_a}{r_{cc}} = \frac{t'}{t} = m = \frac{D'}{D} = \frac{1}{\frac{D}{f_{obj}} - 1} \Rightarrow D = \left(\frac{1}{m} + 1\right) f_{obj}$$

The position of the target and of a coordinate system that is fixedly connected thereto relative to the sensor or reference coordinate system can be produced by way of an imaginary shift from an originally congruent location of both coordinate systems to the considered position of the target. This shift can be made up of three translations (one in each case in the direction of the three axes of the reference system) and three successively performed rotations about the axes of the target coordinate system in its respective location that has been brought about by the prior shifts, where attention is paid to the sequence of the different rotations (Euler angle). If the locations of the target coordinate system are marked using prime symbols as per the individual imaginary shifts, specifically a single prime after the translations, a double prime after the first rotation, and a triple prime after the second rotation, then, as shown in FIG. 14:

Rotation about the $z_t'$-axis:

$$\Psi = \tan^{-1}\left(\frac{C_{0y} - B_{0y}}{C_{0x} - B_{0x}}\right)$$

Rotation about the $y_t''$-axis:

$$\Theta = \cos^{-1}\left(\frac{a_0}{m \cdot a}\right)$$

Rotation about the $x_t'''$-axis:

$$\beta_0 = \cos^{-1}\left(\frac{a_0^2 + c_0^2 - b_0^2}{2 \cdot a_0 \cdot c_0}\right); \text{ [cosine theorem]}$$

$$s_0 = c_0 \cdot \cos(\beta_0); h_1 = \frac{s_0 - \frac{a_0}{2}}{\sin(\Theta)}$$

$$\phi = \sin^{-1}\left(\frac{h_1}{m \cdot h}\right)$$

The translation of the centerpoint is:

$$x = \frac{P_{0x}}{m}; y = \frac{P_{0y}}{m}; z = D_{ref} - D$$

where $D_{ref}$ is the distance of the sensor from the zero point of the reference system.

This describes the position of the marker 22 and its translation and rotation with respect to the sensor.

The system can be used not only to measure the translation and rotation of a component moving relative to a reference system (even though this is a desired use), but also to ascertain the position with respect to the translation and rotation of a component relative to a reference position (for example target at the center of the image, target surface perpendicular to the optical axis of the camera) with just a single image, even if the object does not move at all but is merely positioned differently relative to the reference position.

Preferably, the calculation of a movement is also always performed such that first, the position of the target with reference to the reference position is calculated for each image and then the movement from one image to the other is described by way of comparing the positions (difference of the values of two images).

The point P or the centerpoint 36 is the measurement point or evaluation point, that is to say the point of the target (and thus also of the component), for which the movement of the target (and of the object) is calculated and evaluated.

The point P or the centerpoint 36 is preferably identical to the centerpoint of the circumcircle around the three sub-marker points, also the centerpoint of the triangle formed by the three points only in the case of the target of type A.

The method for capturing and measuring the translation and the rotation of a component 20 moving relative to a reference system includes:

a) providing a marker 22 on the component 20, wherein the marker 22 has on an upper side 26 at least three points A, B, C, which do not lie on a straight line, b) providing a measurement system 28 having a camera 30, which is arranged in the reference system, and having an evaluation unit 32, in which the geometry of the upper side 26 and thus in particular of the three points A, B, C is stored, c) aligning the camera 30 with the three points A, B, C, in particular a centerpoint P of the three points A, B, C, d) capturing a first image of the marker 22 and of the component 20, which are located in a first position, and determining the location of the three points A, B, C in the first image, wherein the x- and y-coordinates of the three points A, B, C and possibly the alignment thereof in the image plane of the first image are determined, e) calculating a first position of the marker in three-dimensional space with respect to translation and rotation relative to a reference position at the time point at which the first image is created, f) capturing a second image of the marker 22 and of the component 20, which are located in a second position, which differs from the first position, and determining the location of the three points A, B, C in the second image, wherein the x- and y-coordinates of the three points A, B, C and possibly the alignment thereof in the image plane of the second image are determined, g) calculating a second position of the marker in three-dimensional space with respect to translation and rotation relative to a reference position at the time point at which the second image is created, h) comparing the x- and y-coordinates and the alignment of the three points A, B, C in the two images and calculating the translation and rotation of the component 20 in three-dimensional space between the first and the second position of the component 20.

When calculating the translation and/or rotation of the component 20, preferably a comparison is performed of the x- and y-coordinates and the alignment of the three points (A, B, C) in the two images.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for capturing and measuring translation and rotation of a component moving relative to a reference system, the method comprising:
    a) providing a marker on the component, wherein the marker is a two-dimensional entity with at least three points that do not lie on a straight line, and wherein each of the at least three points lie on a same plane;
    b) providing a measurement system having a camera arranged in the reference system which translation and/or rotation of the moving component are captured, the measurement system also having an evaluation unit connected to the camera, the evaluation unit configured to store a geometry of an upper side of the marker and the at least three points, wherein the evaluation unit captures and stores at least one parameter selected from at least one of a distance of the camera from the marker, a focal length of an objective lens of the camera, and an active sensor width and active sensor height of a sensor of the camera;
    c) aligning the camera with the at least three points;
    d) capturing a first image of the marker and of the component in a first position and determining a location of the at least three points in the first image, wherein x- and y-coordinates of the at least three points and alignment of the at least three points in an image plane of the first image are determined, and wherein the actual position occupied by each of the at least three points are obtained by setting a height of the first image to a height of the active sensor and a width of the first image to a width of the active sensor;
    e) capturing a second image of the marker and of the component in a second position different than the first position and determining a location of the at least three points in the second image, wherein the x- and y-coordinates of the at least three points and alignment of the at least three points in the image plane of the second image are determined, and wherein for each of the first image and the second image a circumcircle of a triangle formed by the at least three points is calculated from x- and y-coordinates of the at least three points and a center of the circumcircle is ascertained and said center of the circumcircle is used as a centerpoint of the marker, and wherein an optical axis of the camera is directed in an initial setting onto the centerpoint of the marker, and wherein the actual positions occupied by each of the at least three points are obtained by setting a height of the second image to the height of the active sensor and a width of the second image to the width of the active sensor; and
    f) calculating a translation and/or rotation of the component in three-dimensional space between the first and the second position of the component.

2. The method according to claim 1, wherein the at least three points are arranged on corners of a triangle.

3. The method according to claim 2, wherein the triangle is an isosceles triangle.

4. The method according to claim 2, wherein the triangle is an equilateral triangle.

5. The method according to claim 1, wherein the sensor of the camera is a CCD sensor.

6. The method according to claim 1, wherein the marker has a rigid carrier.

7. The method according to claim 6, wherein the rigid carrier is attached to the component.

8. A measurement system for capturing and measuring translation and rotation of a component of a motor vehicle moving relative to a reference system, the measurement system configured to:
    provide a marker on the component, wherein the marker is a two-dimensional entity with at least three points that do not lie on a straight line, and wherein each of the at least three points lie on a same plane;
    provide the measurement system having a camera arranged in the reference system which translation and/or rotation of the moving component are captured, the measurement system also having an evaluation unit connected to the camera, the evaluation unit configured to store a geometry of an upper side of the marker and the at least three points, wherein the evaluation unit captures and stores at least one parameter selected from at least one of a distance of the camera from the marker, a focal length of an objective lens of the camera, and an active sensor width and active sensor height of a sensor of the camera;

align the camera with the at least three points;
capture a first image of the marker and of the component in a first position and determining a location of the at least three points in the first image, wherein x- and y-coordinates of the at least three points and alignment of the at least three points in an image plane of the first image are determined, and wherein the actual position occupied by each of the at least three points are obtained by setting a height of the first image to a height of the active sensor and a width of the first image to a width of the active sensor;
capture a second image of the marker and of the component in a second position different than the first position and determining a location of the at least three points in the second image, wherein the x- and y-coordinates of the at least three points and alignment of the at least three points in the image plane of the second image are determined, and wherein for each of the first image and the second image a circumcircle of a triangle formed by the at least three points is calculated from x- and y-coordinates of the at least three points and a center of the circumcircle is ascertained and said center of the circumcircle is used as a centerpoint of the marker, and wherein an optical axis of the camera is directed in an initial setting onto the centerpoint of the marker, and wherein the actual positions occupied by each of the at least three points are obtained by setting a height of the second image to the height of the active sensor and a width of the second image to the width of the active sensor; and
calculate a translation and/or rotation of the component in three-dimensional space between the first and the second position of the component.

9. The system according to claim 8, wherein the marker has a carrier configured to be resistant to vibrations.

10. The system according to claim 8, wherein the at least one of the at least three points are configured as a circular disk.

11. The system according to claim 8, wherein the at least the three points are arranged on corners of a triangle selected from an isosceles triangle or an equilateral triangle.

12. The system according to claim 8, wherein the marker has a carrier and an upper side of the carrier is planar.

13. The system according to claim 8, wherein the at least three points are of a first color and a background of the upper side of the marker is of a second color different than the first color.

14. The system according to claim 8, wherein a transition from one point of the at least three points to a background of the upper side is discontinuous.

15. The system according to claim 8, wherein the evaluation unit includes a computer with a program for image capturing and evaluation, a memory for storing the geometry of the upper side of the marker and the at least three points of the marker.

16. One or more non-transitory computer-readable media storing processor-executable instructions that, when executed by at least one processor, cause the at least one processor to:
 a) providing a marker on a component, wherein the marker is a two-dimensional entity with at least three points that do not lie on a straight line, and wherein each of the at least three points lie on a same plane;
 b) providing a measurement system having a camera arranged in a reference system which translation and/or rotation of a moving component are captured, the measurement system also having an evaluation unit connected to the camera, the evaluation unit configured to store a geometry of an upper side of the marker and the at least three points, wherein the evaluation unit captures and stores at least one parameter selected from at least one of a distance of the camera from the marker, a focal length of an objective lens of the camera, and an active sensor width and active sensor height of a sensor of the camera;
 c) aligning the camera with the at least three points;
 d) capturing a first image of the marker and of the component in a first position and determining a location of the at least three points in the first image, wherein x- and y-coordinates of the at least three points and alignment of the at least three points in an image plane of the first image are determined, and wherein the actual position occupied by each of the at least three points are obtained by setting a height of the first image to a height of the active sensor and a width of the first image to a width of the active sensor;
 e) capturing a second image of the marker and of the component in a second position different than the first position and determining a location of the at least three points in the second image, wherein the x- and y-coordinates of the at least three points and alignment of the at least three points in the image plane of the second image are determined, and wherein for each of the first image and the second image a circumcircle of a triangle formed by the at least three points is calculated from x- and y-coordinates of the at least three points and a center of the circumcircle is ascertained and said center of the circumcircle is used as a centerpoint of the marker, and wherein an optical axis of the camera is directed in an initial setting onto the centerpoint of the marker, and wherein the actual positions occupied by each of the at least three points are obtained by setting a height of the second image to the height of the active sensor and a width of the second image to the width of the active sensor; and
 f) calculating a translation and/or rotation of the component in three-dimensional space between the first and the second position of the component.

17. The one or more non-transitory computer-readable media of claim 16, wherein the at least three points are arranged on corners of a triangle.

18. The one or more non-transitory computer-readable media of claim 16, wherein the triangle is an isosceles triangle or an equilateral triangle.

19. The one or more non-transitory computer-readable media of claim 16, wherein the sensor of the camera is a CCD sensor.

20. The one or more non-transitory computer-readable media of claim 16, wherein the marker has a rigid carrier and is attached to the component.

* * * * *